US011879352B2

(12) United States Patent
Hellard et al.

(10) Patent No.: US 11,879,352 B2
(45) Date of Patent: Jan. 23, 2024

(54) TOOL FOR REMOVING A FAN DISC FROM A MODULE

(71) Applicant: SAFRAN AIRCRAFT ENGINES, Paris (FR)

(72) Inventors: Sylvain Pierre Theodore Hellard, Moissy-Cramayel (FR); Titu Kumar Barua, Moissy-Cramayel (FR); Eric Serge Guerard, Moissy-Cramayel (FR); Yannick Jean Le Maner, Moissy-Cramayel (FR); Francois Pagliano, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 84 days.

(21) Appl. No.: 17/605,388

(22) PCT Filed: Apr. 21, 2020

(86) PCT No.: PCT/FR2020/000142
§ 371 (c)(1),
(2) Date: Oct. 21, 2021

(87) PCT Pub. No.: WO2020/217003
PCT Pub. Date: Oct. 29, 2020

(65) Prior Publication Data

US 2022/0220866 A1 Jul. 14, 2022

(30) Foreign Application Priority Data

Apr. 26, 2019 (FR) ....................................... 1904463

(51) Int. Cl.
*F01D 25/28* (2006.01)

(52) U.S. Cl.
CPC ........ *F01D 25/285* (2013.01); *F05D 2230/70* (2013.01)

(58) Field of Classification Search
CPC . F01D 25/285; F05D 2230/70; B25H 1/0007; F16M 1/02; F16M 11/04
See application file for complete search history.

(56) References Cited

U.S. PATENT DOCUMENTS

2012/0151735 A1 6/2012 Thomas

FOREIGN PATENT DOCUMENTS

EP 3051077 A1 * 8/2016
FR 3069229 A1 1/2019
(Continued)

OTHER PUBLICATIONS

Machine Translation of EP 3051077 A1 (Year: 2016).*
(Continued)

*Primary Examiner* — Christopher J Besler
(74) *Attorney, Agent, or Firm* — WOMBLE BOND DICKINSON (US) LLP

(57) ABSTRACT

A tool for removing a fan disc from a module of a turbine engine including a rotor and a stator, the rotor including the fan disc, a drum and a sealing part secured to one another via bolts each including a screw and a nut, each screw passing through a retaining member having at least two lugs arranged around a head of the screw, the stator being delimited by a straightener having a flange, the tool including a frame; a plate including pins and two holes, each of the pins being configured to support the head of a screw, each hole being configured to receive an indexing finger; at least three supports including bearing surfaces configured to support the flange of the straightener; a visual marker configured to angularly orient the module with respect to the tool.

10 Claims, 9 Drawing Sheets

(56) References Cited

FOREIGN PATENT DOCUMENTS

| | | | |
|---|---|---|---|
| WO | 2013/164551 | A1 | 11/2013 |
| WO | 2019/068985 | A1 | 4/2019 |

OTHER PUBLICATIONS

International Search Report received for PCT Patent Application No. PCT/FR2020/000142, dated Jul. 15, 2020, 5 pages (2 pages of English Translation and 3 pages of Original Document).

* cited by examiner

[Fig.1]
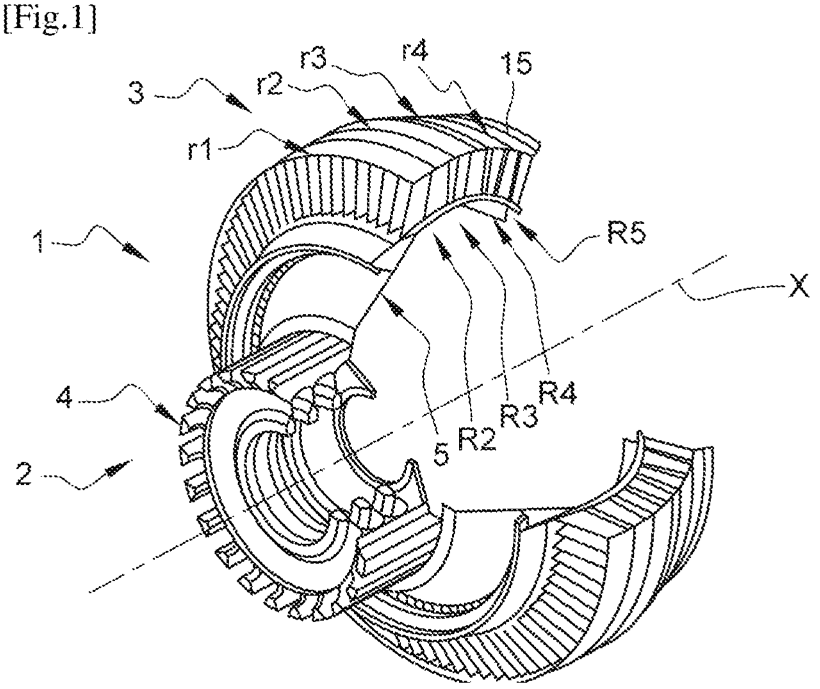
[Fig.2]
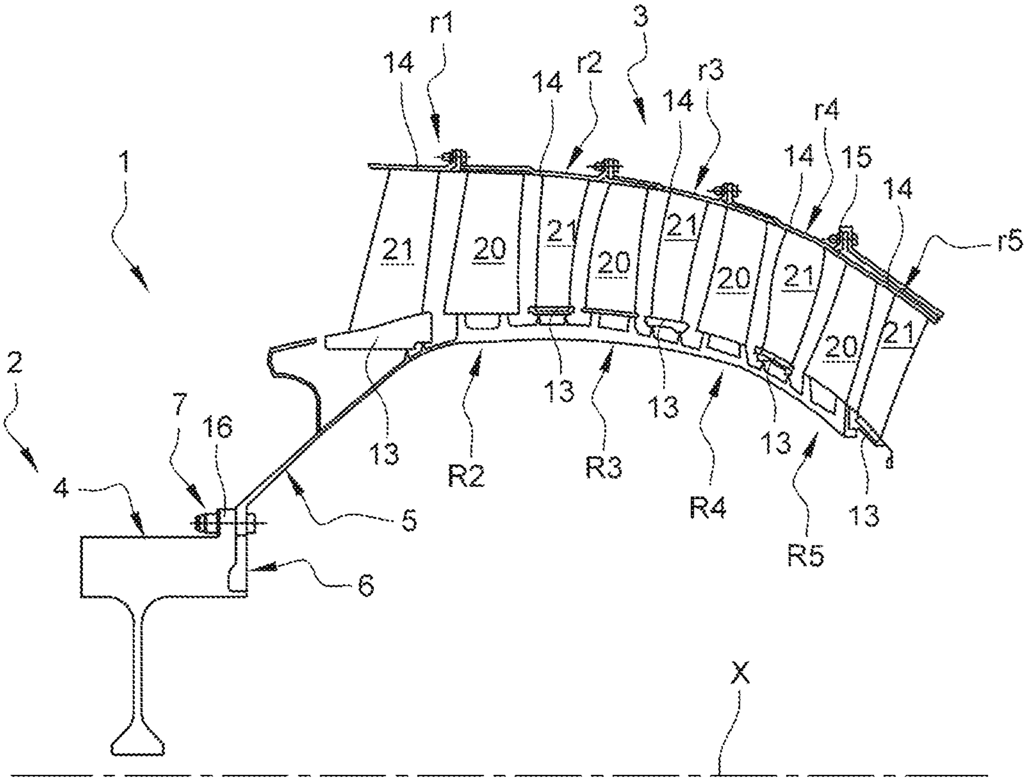

[Fig.3]
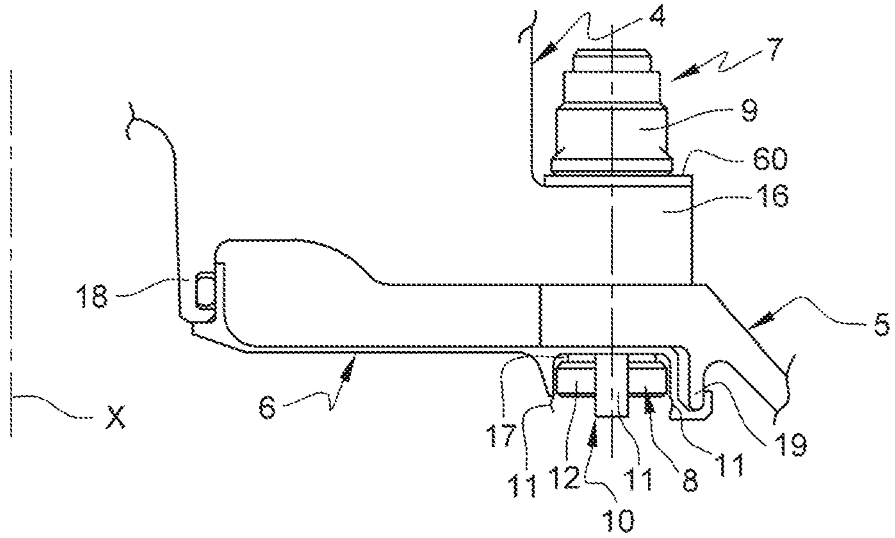
[Fig.4]
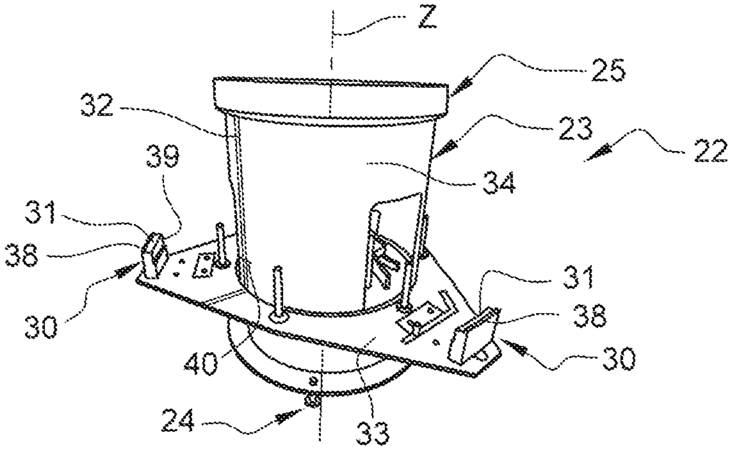

[Fig.5]
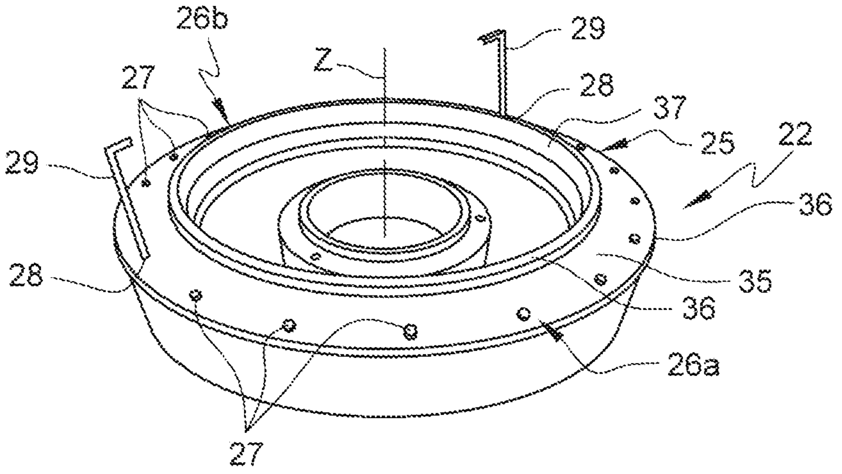
[Fig.6]
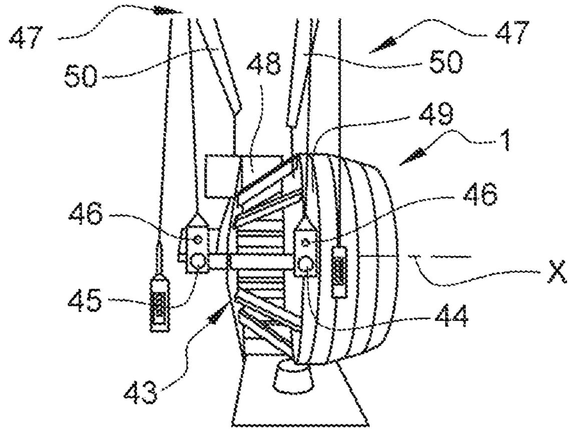

[Fig.7]
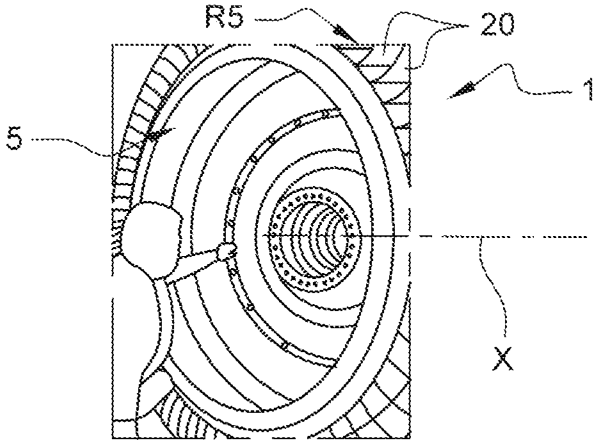
[Fig.8]
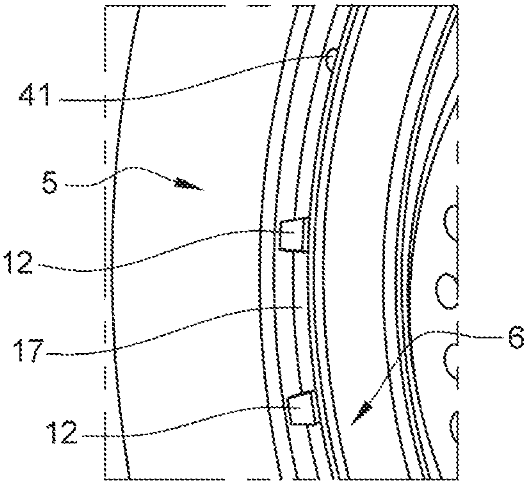

[Fig.9]
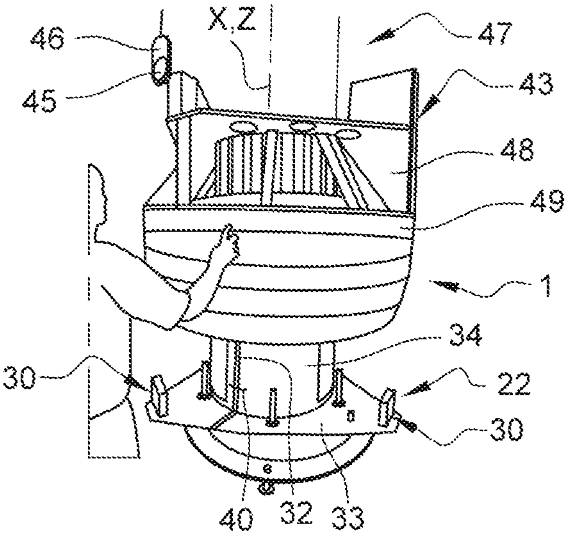
[Fig.10]
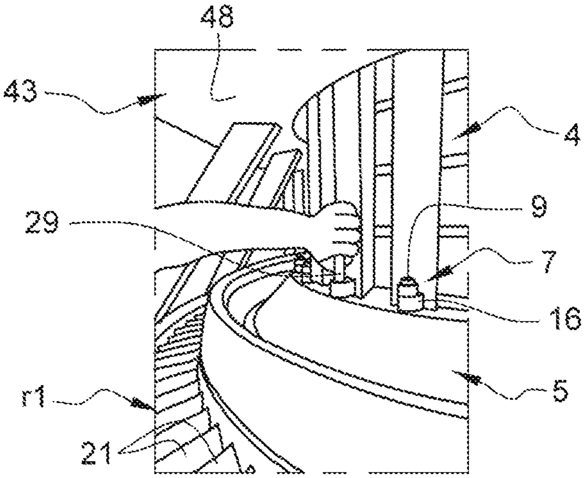

[Fig.11]
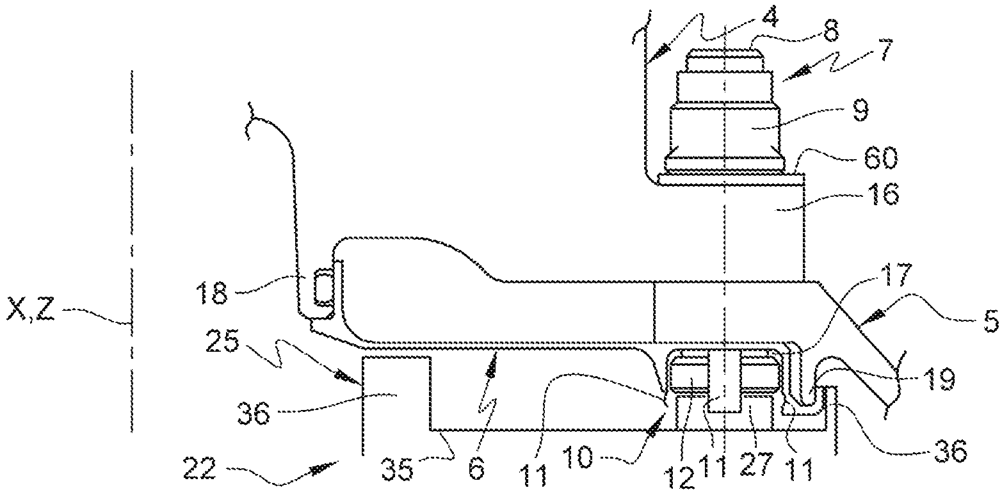
[Fig.12]
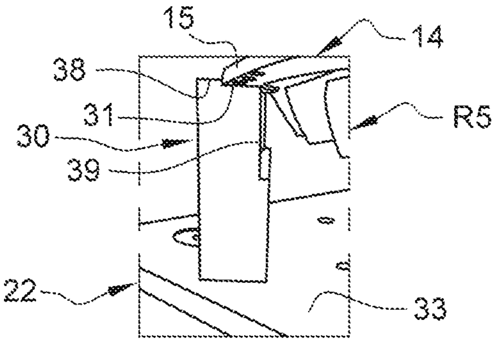
[Fig.13]
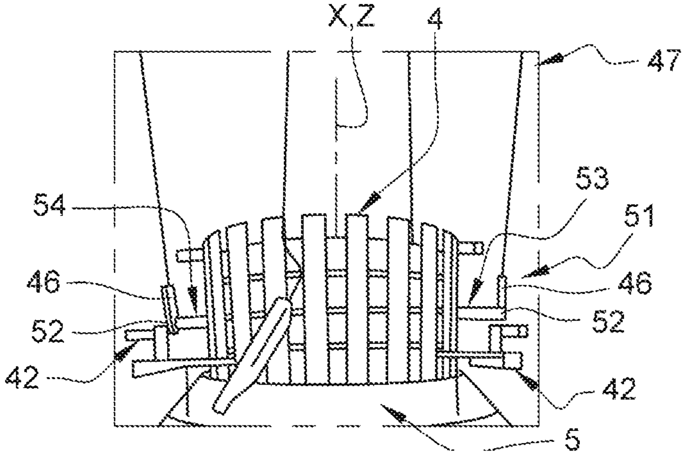

[Fig.14]
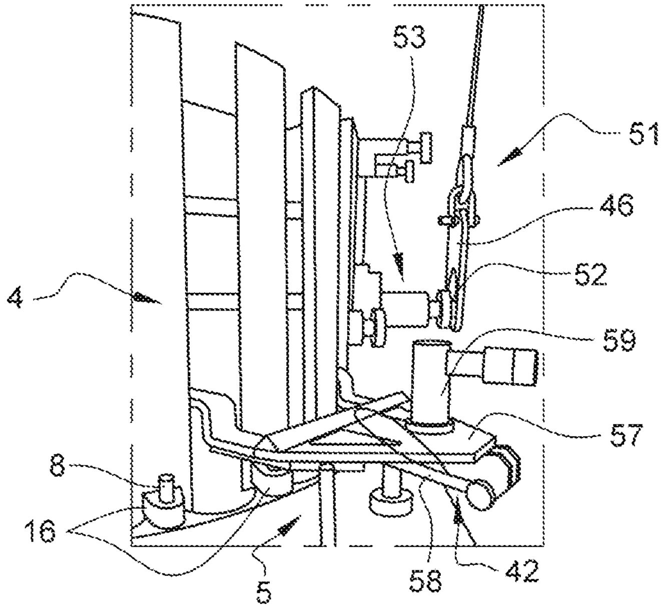
[Fig. 15]
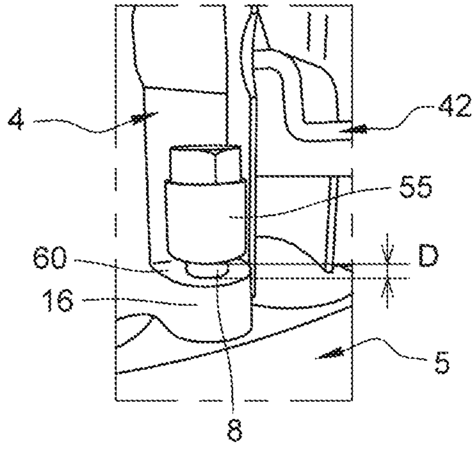

[Fig.16]
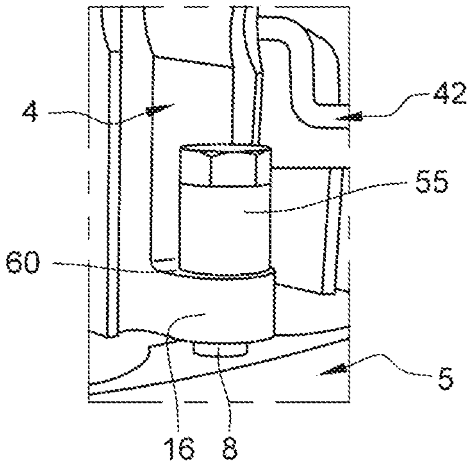
[Fig.17]
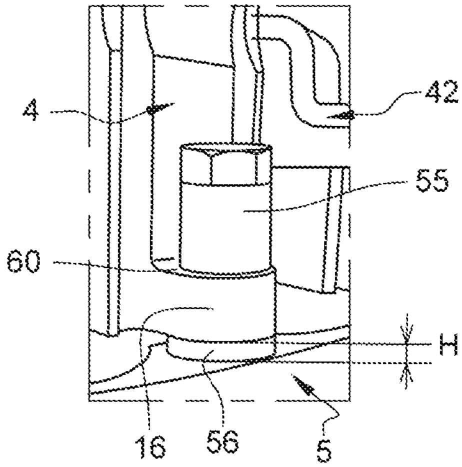

[Fig.18]
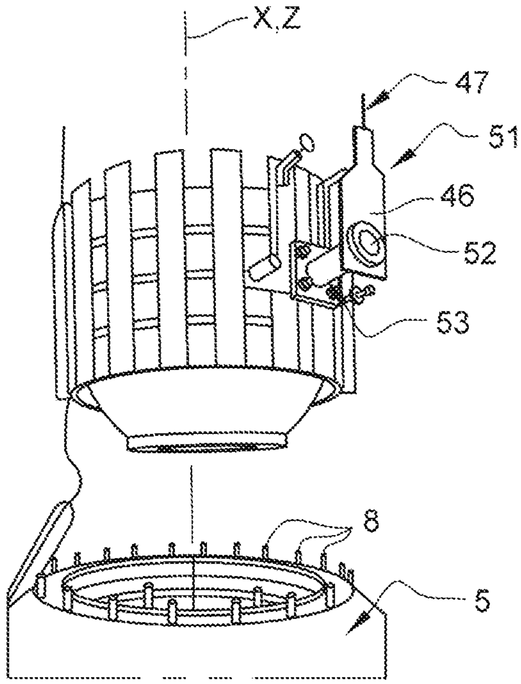

TOOL FOR REMOVING A FAN DISC FROM A MODULE

TECHNICAL FIELD OF THE INVENTION

The present invention relates in particular to a tool for removing a fan disc alone from a module and to a method for removing a fan disc alone from a module by means of such a tool.

BACKGROUND

A turbomachine, such as a turbofan engine, comprises, from upstream to downstream in the direction of gas flow, a fan, one or more compressor stages (low pressure then high pressure), a combustion chamber, one or more turbine stages (high pressure then low pressure) and an exhaust nozzle.

Such a turbomachine corresponds to the assembly of a plurality of modules mounted in relation to each other. During a maintenance operation, various modules are dismounted and transported to different stations in order to undergo various maintenance operations (replacement of the wearing parts, replacement/repair of defective parts, etc.) necessary to put the turbomachine back into service.

In the following, we will focus on the "low-pressure compressor module", hereinafter referred to as "module".

Such a module is defined along a longitudinal axis X and comprises a rotor and a stator which are independent of each other.

The rotor comprises in particular a fan disc, a drum and an annular sealing part centered on the axis X and secured to each other by a circular row of bolts each comprising a screw and a nut. Each screw also passes through a retaining member arranged inside the rotor. Each retaining member has at least two opposing lugs arranged around a head of the screw and projecting from it, this retaining member allowing to hold the head of the corresponding screw in place when the associated nut is removed, which is itself located outside the rotor. The rotor also comprises several annular rows of vanes fitted to the drum and arranged one behind the other, each row of vanes being more commonly referred to as an impeller.

The stator is centered on the axis X and surrounds the drum. The stator comprises several compressor stator vanes annular assemblies interposed between the impellers. The first assembly of compressor stator vanes is associated with the fan so as to form the stage n° 1, the following being each associated with an impeller so as to form the following stages. Each compressor stator vanes assembly comprises an inner shell and an outer shell connected to each other by an annular row of vanes. The outer shells of all the compressor stator vanes assemblies are flanged together.

The existing tools allow the entire module to be dismounted according to a determined method, whereby the fan disc is one of the elements of the module last removed. In other words, the removal of the fan disc cannot be done without a complete dismounting of the module.

There is an increasing demand for maintenance operations on the fan disc only, these maintenance operations requiring only the removal of the fan disc.

It is understood that the existing tools are not suitable in the case where it is necessary to remove only the fan disc. Indeed, as mentioned above, for such an operation, the operators are obliged to proceed to a complete dismounting of the module, to the detriment of the productivity.

The objective of the present invention is thus to propose, on the one hand, a tool for removing a fan disc alone from a module and, on the other hand, a method for removing a fan disc alone from a module by means of such a tool, thus allowing a gain in productivity.

SUMMARY OF THE INVENTION

The invention thus proposes a tool for removing a fan disc alone from a module having a longitudinal axis X of a turbomachine comprising a rotor and a stator, the rotor comprising the fan disc, a drum and an annular sealing part centered on the axis X and secured to one another via a circular row of bolts each comprising a screw and a nut, each screw passing through a retaining member arranged inside the rotor, each retaining member having at least two opposing lugs arranged around a head of the screw and projecting with respect to the head, the stator being centered on the axis X and surrounding the drum, the stator being longitudinally delimited by a compressor stator vanes assembly arranged opposite the fan disc, the compressor stator vanes assembly comprising an outer shell having a flange, the tool having a vertical axis Z comprising:

- a frame comprising ground support means;
- an annular plate centered on the axis Z and secured to the frame, this plate comprising first and second circular rows of pins as well as two holes arranged around the axis Z at a regular pitch, each of the two holes being arranged between the first and second rows, each of the pins being configured to bear the head of a screw so as not to damage the lugs of the retaining members, each hole being configured to receive an indexing finger of the module relative to the tool;
- at least three supports distributed in a regular manner around the axis Z and secured to the frame, each support comprising a bearing surface, the bearing surfaces being coplanar and being configured to support the flange of the compressor stator vanes assembly of the module, the three supports being vertically located below the plate;
- a first visual marker arranged on the frame and configured to angularly orient the module relative to the tool.

Such a tool allows the removal of the fan disc alone while keeping the rest of the module assembled. Thus, during a maintenance operation involving only the fan disc, such a tool allows a significant gain in productivity.

In addition, such a tool allows the removal of the fan disc alone without damaging other components of the module, in particular the retaining members and the screws.

Such a tool can also be used to re-install the repaired fan disc (or to install a new fan disc) on the rest of the assembled module.

The tool according to the invention may comprise one or more of the following characteristics and/or steps, taken alone or in combination with each other:

- the first visual marker is a vertical line;
- the tool comprises a second visual marker arranged on the frame and configured to determine a vertical position of the module from which the module is to be indexed relative to the tool;
- the second visual marker is a horizontal line;
- each of the three supports comprises a recess configured to allow the passage of an annular row of vanes fitted to the drum.

The present invention also relates to a method for removing a fan disc alone from a module having a longitudinal axis X of a turbomachine comprising a rotor and a stator, the rotor comprising the fan disc, a drum and an annular sealing part centered on the axis X and secured to one another via a circular row of bolts each comprising a screw and a nut, each screw passing through a retaining member arranged inside the rotor, each retaining member having at least two opposing lugs arranged about a head of the screw and projecting with respect to the head, the stator being centered on the axis X and surrounding the drum, the stator being longitudinally delimited by a compressor stator vanes assembly arranged opposite the fan disc, the compressor stator vanes assembly comprising an outer shell having a flange, by means of the tool as previously described, the method comprising chronologically the steps of:

a) removing two predetermined bolts hereinafter referred to as reference bolts so as to have two free orifices at the level of the rotor, the angular distance between the reference bolts being equal to the angular distance between the two holes of the plate;

b) positioning the module above the tool in a vertical position so that the longitudinal axis X of the module is substantially vertical and substantially coaxial with the vertical axis Z of the tool, the fan disc then being vertically above the drum;

c) aligning one of the free orifices with the first visual marker so as to angularly orient the module with respect to the tool;

d) indexing the module with respect to the tool by introducing two indexing fingers from the outside of the module, each indexing finger passing through a free orifice of the rotor and then through a hole of the plate;

e) abutting the heads of the screws on the pins of the plate, the drum then surrounding the plate;

f) abutting the flange of the compressor stator vanes assembly on the bearing surfaces of the three supports;

g) removing all the nuts from the bolts;

h) extracting in a controlled manner the fan disc alone via at least one extractor;

i) removing the fan disc alone.

Such a method allows the removal of the fan disc alone, by means of the tool, while keeping the rest of the module assembled. Thus, during a maintenance operation involving only the fan disc, the implementation of such a method allows a significant gain in productivity.

In addition, such a method allows the removal of the fan disc alone without damaging the other components of the module, in particular the retaining members and the screws.

The method according to the invention may comprise one or more of the following characteristics and/or steps, taken alone or in combination with each other:

the fan disc is extracted during the step h) via three extractors distributed in a regular manner around the axis Z, the extraction being controlled by progressively unscrewing three extraction nuts previously screwed onto three screws each located close to one of the three extractors, and by progressively inserting wedges around the three screws having the extraction nuts between the fan disc and the drum, the extraction nuts and the wedges being in a non-metallic material;

the step h) comprises the sub-steps of:

h1) arranging each extraction nut at a distance D from a upper face of a corresponding lobe of the fan disc, the upper face being arranged opposite the extraction nut;

h2) actuating the three extractors so that each upper face is in contact with the corresponding extraction nut;

h3) arranging one or more wedges having a total height H around each screw having an extraction nut between the fan disc and the drum, the total height H being equal to the distance D, the step d) is carried out when the flange of the compressor stator vanes assembly is located vertically at the level of a second visual marker arranged on the frame of the tool;

the module is held during the steps a) to f) via a first handling tooling on which the module is positioned and held, the first handling tooling comprising at least one pair of opposing first trunnions, each of the first trunnions being linked to a bracket of a lifting system;

the first handling tooling is configured to allow the positioning of the rotor relative to the stator to be adjusted longitudinally over a predetermined range or vice versa;

the fan disc is held during the steps g) to i) via a second handling tooling on which the fan disc is positioned and held, the second handling tooling comprising at least one pair of opposing second trunnions, each of the second trunnions being linked to a bracket of a lifting system.

BRIEF DESCRIPTION OF FIGURES

The invention will be better understood and other details, characteristics and advantages of the present invention will become clearer from the following description made by way of non-limiting example and with reference to the attached drawings, in which:

FIG. 1 is a cutaway and perspective view showing the module in a second state E2;

FIG. 2 is an axial half-section view showing the module in a first state E1;

FIG. 3 is a detail view of FIG. 2 showing in particular the assembly of a fan disc, a drum and an annular sealing part via bolts;

FIG. 4 is a perspective view of a tool for removing the fan disc of the module shown in FIGS. 1 to 3;

FIG. 5 is a detail view of FIG. 4;

FIG. 6 is a perspective view of the module positioned in a horizontal position as part of a method for removing a fan disc from a module shown in FIGS. 1 to 3 by means of a tool shown in FIGS. 4 and 5;

FIG. 7 is a perspective view showing a step of removing two reference bolts so that two free orifices are available;

FIG. 8 is a detail view of FIG. 7 showing a free orifice;

FIG. 9 is a perspective view showing a step of aligning one of the free orifices with a first visual marker of the tool;

FIG. 10 is a perspective view showing a step of indexing the module with respect to the tool;

FIG. 11 is a half-axial sectional view illustrating a step consisting in abutting screw heads on pins of a plate of the tool;

FIG. 12 is a perspective view illustrating a step of abutting a flange of a compressor stator vanes assembly of the module onto bearing surfaces of supports;

FIG. 13 is a perspective view showing a step of extracting in a controlled manner the fan disc;

FIG. 14 is a detail view of FIG. 13;

FIG. 15 is a perspective view showing a sub-step of arranging extraction nuts on screws;

FIG. 16 is a perspective view showing a sub-step of actuating extractors;

FIG. 17 is a perspective view showing a sub-step of interposing one or more wedges;

FIG. 18 is a perspective view showing a step of removing the fan disc alone.

DETAILED DESCRIPTION OF THE INVENTION

FIGS. 1 and 2 show a module 1 (low-pressure compressor module) of a turbomachine defined along a longitudinal axis X and comprising a rotor 2 and a stator 3 which are independent of each other, and in other words the rotor 2 and the stator 3 are not guided relative to each other via a bearing, for example. The longitudinal axis X of the module 1 is coincident with the longitudinal axis of the turbomachine when the module 1 is in place in the turbomachine.

In the present application, the terms "inner" and "outer" associated with the various components of the module 1 are defined with respect to the longitudinal axis X.

More specifically, the rotor 2 comprises a fan disc 4, a drum 5 and an annular sealing part 6 centered on the axis X and secured to each other by a circular row of bolts 7 each comprising a screw 8 and a nut 9. Each screw 8 passes through a retaining member 10 arranged inside the rotor 2. Each retaining member 10 has at least two opposing lugs 11 arranged around a head 12 of the screw 8 and projecting from the head 12.

The stator 3 is centered on the axis X and surrounds the drum 5. The stator 3 is longitudinally delimited by a compressor stator vanes assembly r4 arranged opposite the fan disc 4, the compressor stator vanes assembly r4 comprising an outer shell 14 having a flange 15.

According to the embodiment illustrated in the figures and in particular in FIGS. 1 to 3, the fan disc 4 is arranged upstream of the drum 5 and comprises a plurality of cells each intended to receive a fan vane (not included in the module 1). The fan disc 4 has a plurality of lobes 16 evenly distributed around the axis X at the level of its downstream end, these lobes 16 forming a flange. The fan disc 4 is partially shown in FIG. 2. The head 12 of each screw 8 is arranged inside the rotor 2. The nut 9 of each bolt 7 is arranged outside the rotor 2. Each screw 8 passes successively from the head 12 to the corresponding nut 9 through a through hole made in the corresponding retaining member 10, through a through hole made in the sealing part 6, through a through hole made in a flange of the drum 5 and through a through hole made in a lobe 16 of the fan disc 4. The screws 8 have a square head 12.

As illustrated in FIG. 3, each retaining member 10 is disposed longitudinally between the head 12 of the corresponding screw 8 and the sealing part 6. Each retaining member 10 comprises four lugs 11 facing each other in pairs which surround the head 12 of the corresponding screw 8, the lugs 11 projecting from the head 12. The retaining members 10 and the heads 12 of the screws 8 are arranged in a common circular groove 17 of the sealing part 6. A retaining member 10 allows to hold the head 12 of the corresponding screw 8 (located inside the rotor 2) in place when the associated nut 9 (located outside the rotor 2) is removed.

The sealing part 6 is also press-fitted on a projection 18 of the fan disc 4 at the level of its inner end and hooked onto a projection 19 of the drum 5 at the level of its outer end.

As illustrated in FIG. 2, the rotor 2 also comprises four annular rows of vanes 20 fitted to the drum 5 and arranged one behind the other, each row of vanes 20 being more commonly referred to as an "impeller". The four impellers are respectively numbered, from upstream to downstream, as impeller R2 (for impeller n° 2) to impeller R5 (for impeller n° 5), with impeller R1 (for impeller n° 1) being considered the fan.

According to the embodiment shown in the figures and in particular in FIG. 2, the stator 3 comprises five compressor stator vanes annular assemblies interposed between the impellers. The five compressor stator vanes assemblies are numbered, from upstream to downstream, compressor stator vanes assembly r1 (for compressor stator vanes assembly n° 1) to compressor stator vanes assembly r5 (for compressor stator vanes assembly n° 5). The first assembly of compressor stator vanes r1 is associated with the fan so as to form the stage n° 1, the following ones being each associated with an impeller (impellers R2 to R5) so as to form the following stages (stage n° 2 to stage n° 5). Each compressor stator vanes assembly r1 to r5 comprises an inner shell 13 and an outer shell 14 connected to each other by an annular row of vanes 21. The vanes 21 are for example welded to the inner and outer shells 13, 14 so as to form a mechanically welded assembly. The outer shells 14 of all the compressor stator vanes assemblies r1 to r5 are flanged together.

By convention, in the present application, the terms "upstream" and "downstream" are defined in relation to the direction of flow of the gases in the module 1, the gases passing successively through the different stages.

FIG. 2 illustrates the module 1 in a first state E1 corresponding to the module 1 as it is when it is received to undergo a maintenance operation.

FIG. 1 shows the module 1 in a second state E2 in which the fifth assembly of compressor stator vanes r5 has been removed, the outer shell 14 of the fourth assembly of compressor stator vanes r4 having a free flange 15. The second state E2 corresponds to the state of the module 1 for the removal of the fan disc 4 alone.

A module 1 in a third state E3 corresponds to a module 1 in a second state E2 from which the fan disc 4 has been removed.

The fan disc 4 alone is removed from a module 1 in a second state E2 by means of a tool 22.

According to the invention, the tool 22 is defined along a vertical axis Z and comprises:

- a frame 23 comprising ground support means 24;
- an annular plate 25 centered on the axis Z and secured to the frame 23, this plate 25 comprising first and second circular rows 26*a*, 26*b* of pins 27 as well as two holes 28 arranged around the axis Z at a regular pitch, each of the two holes 28 being arranged between the first and second rows 26*a*, 26*b*, each of the pins 27 being configured to bear the head 12 of a screw 8 so as not to damage the lugs 11 of the retaining members 10, each hole 28 being configured to receive an indexing finger 29 of the module 1 relative to the tool 22;
- at least three supports 30 distributed in a regular manner around the axis Z and secured to the frame 23, each support 30 comprising a bearing surface 31, the bearing surfaces 31 being coplanar and being configured to support the flange 15 of the compressor stator vanes assembly r4 of the module 1, the three supports 30 being vertically located below the plate 25;
- a first visual marker 32 arranged on the frame 23 and configured to angularly orient the module 1 with relative to the tool 22.

In the present application, the terms "lower" and "upper" associated with the various components of the tool 22 are defined with respect to the vertical axis Z. Further, in the present application, the terms "inner" and "outer" associated with the various components of the tool 22 are defined with respect to the vertical axis Z.

According to the embodiment illustrated in the figures and in particular in FIGS. 4 and 5, the frame 23 comprises a platform 33 on which the supports 30 rest and a barrel 34 on which the plate 25 rests. The platform 33 is planar, perpendicular to the axis Z and substantially triangular, each support 30 being arranged at the level of a protruding angular portion of the platform 33. The barrel 34 is centered on the axis Z and rises from the platform 33. The ground support means 24 comprise here three feet evenly distributed around the axis Z.

The plate 25 comprises an annular upper surface 35 delimited by two rims 36, the rims 36 being configured to hold the ends of the sealing part 6 when the repaired fan disc (or a new fan disc) is press-fitted on a module 1 in a third state E3. The pins 27 of the first and second rows 26*a*, 26*b* are arranged on the upper surface 35. The first and second rows 26*a*, 26*b* have the same number of pins 27 (in this case ten pins) and are symmetrical with respect to the axis Z. The holes 28 are thus also symmetrical with respect to the axis Z. The pins 27 as well as the two holes 28 are arranged equidistant from the axis Z. The holes 28 are blind holes opening at the level of the upper surface 35. The angular distance between the two holes 28 is 180 degrees. The indexing fingers 29 have been shown in FIG. 5 to indicate the location of the holes 28. The plate 25 comprises a thermal shield 37 at the level of its inner surface, so as to protect the plate 25 from the heat when the repaired fan disc (or a new fan disc) is press-fitted. In fact, to perform the press-fitting, the sealing part 6 is heated to a predetermined temperature.

The bearing surfaces 31 lie in a common plane perpendicular to the axis Z. Each bearing surface 31 is located at an upper end of the corresponding support 30. Each bearing surface 31 is in the form of an annular sector and is delimited on the outside by an edge 38. The three supports 30 are arranged in relation to the pins 27 in such a way that the heads 12 are supported before the flange 15 when the module 1 is positioned on the tool 22. Each support 30 comprises a recess 39 oriented on the side of the vertical axis Z and configured to allow the passage of the fifth assembly of compressor stator vanes R5, when the module 1 is positioned on the tool 22. The supports 30 may be adjustable relative to the platform 33 in a direction perpendicular to the axis Z.

The first visual marker 32 is in the form of a vertical line 32 arranged on the periphery of the barrel 34 and the periphery of the plate 25, said vertical line 32 being configured to angularly orient the module 1 relative to the tool 22. This first visual marker 32 may be obtained via the application of one or more self-adhesive strips.

The tool 22 comprises a second visual marker 40 in the form of a horizontal line 40 arranged on the periphery of the barrel 34, said horizontal line 40 being configured to determine a vertical position of the module 1 from which the module 1 is to be indexed relative to the tool 22. Here the horizontal line crosses the vertical line. In the same manner as the first visual marker 32, this second visual marker 40 may be obtained via the application of one or more self-adhesive strips.

Advantageously, the plate 25 and the supports 30 are made of a non-metallic material, so as not to damage the module 1. The plate 25 and the supports 30 are made of Teflon® for example.

The removal of a fan disc 4 alone from a module 1 in a second state E2 by means of the tool 22 is carried out according to a method comprising chronologically the steps of:

a) removing two predetermined bolts 7 hereinafter referred to as reference bolts so as to have two free orifices 41 at the level of the rotor 2, the angular distance between the reference bolts being equal to the angular distance between the two holes 28 of the plate 25; (FIGS. 6 to 8)

b) positioning the module 1 above the tool 22 in a vertical position so that the longitudinal axis X of the module 1 is substantially vertical and substantially coaxial with the vertical axis Z of the tool 22, the fan disc 4 then being vertically above the drum 5;

c) aligning one of the free orifices 41 with the first visual marker 32 so as to angularly orient the module 1 with respect to the tool 22; (FIG. 9)

d) indexing the module 1 with respect to the tool 22 by introducing from the outside of the module 1 two indexing fingers 29, each indexing finger 29 passing through a free orifice 41 of the rotor 2 and then through a hole 28 of the plate 25; (FIG. 10)

e) abutting the heads 12 of the screws 8 on the pins 27 of the plate 25, the drum 5 then surrounding the plate 25; (FIG. 11)

f) abutting the flange 15 of the compressor stator vanes assembly r4 on the bearing surfaces 31 of the supports 30; (FIG. 12)

g) removing all the nuts 9 from the bolts 7;

h) extracting in a controlled manner the fan disc 4 alone via at least one extractor 42; (FIGS. 13 to 17)

i) removing the fan disc 4 alone. (FIG. 18)

As mentioned above, the method is implemented on a module 1 in a second state E2, and in other words a module 1 from which the fifth assembly of compressor stator vanes r5 has been removed.

The module 1 is held during the steps a) to f) via first handling tooling 43 on which the module 1 is positioned and held, the first handling tooling 43 comprising at least one pair of opposing first trunnions 44, 45, each of the first trunnions 44, 45 being linked to a bracket 46 of a lifting system 47.

According to the embodiment illustrated in the figures and in particular in FIGS. 6 to 12, the first handling tooling 43 comprises a first portion 48 adapted to be secured to the rotor 2 of the module 1 and a second portion 49 adapted to be secured to the stator 3 of the module 1. The first handling tooling 43 comprises adjusting means configured to adjust longitudinally over a predetermined range the positioning of the first portion 48 (rotor 2) relative to the second portion 49 (stator 3) or vice versa. As mentioned above, the rotor 2 and the stator 3 are independent of each other. This longitudinal adjustment is used in particular to ensure that the heads 12 of the screws 8 are supported before the flange 15 when the module 1 is positioned on the tool 22. The first handling tooling 43 comprises a pair of median trunnions 44 and a pair of end trunnions 45. Each of the pairs of trunnions 44, 45 is adapted to be secured to an independent lifting system 47. Each lifting system 47 comprises, for example, a lifting device (such as a winch) (not shown), a spreader 50 and two brackets 46.

Advantageously, as illustrated in FIGS. 6 to 8, during the step a), the module 1 is in a horizontal position so that the longitudinal axis X of the module 1 is substantially parallel to the ground on which the tool 22 rests. The first handling tooling 43 is connected to a first lifting system 47 via the median trunnions 44 and to a second lifting system 47 via the end trunnions 45.

As illustrated in FIGS. 6 to 8, during the step a), an operator removes the bolts 7 placed at 3 o'clock and 9 o'clock by analogy with the dial of a clock. The bolts 7 placed at 3 o'clock and 9 o'clock are thus considered to be the reference bolts. The angular distance between the two reference bolts is equal to the angular distance between the two holes 28 of the plate 25, namely 180 degrees. At the end of the step a), the free orifices 41 are now at 3 o'clock and 9 o'clock.

As illustrated in FIGS. 9 to 12, during the steps b) to f), the module 1 is in a vertical position with the fan disc 4 vertically above the drum 5. The first handling tooling 43 is connected to a single lifting system 47 via the end trunnions 45.

As illustrated in FIG. 9, during the step c), an operator controls the first handling tooling 43 so as to align one of the free orifices 41 (identifiable via the absence of the nut) with the vertical line (first visual marker 32). This step c) allows to align the two free orifices 41 with the two holes 28 of the plate 25.

As shown in FIG. 10, the step d) is carried out when the free flange 15 of the compressor stator vanes assembly r4 is vertically at the level of the horizontal line (second visual marker 40). An operator then inserts the two indexing fingers 29 successively from outside the module 1. Each indexing finger 29 passes through a free orifice 41 of the rotor 2 and a hole 28 of the plate 25.

As illustrated in FIG. 11, during the step e), the module 1 is lowered so as to abut the heads 12 of the screws 8 on the pins 27 of the plate 25. It is essential to first abut the rotor 2 (the heads 12 of the screws 8) and then the stator 3 (flange 15 of the compressor stator vanes assembly r4) in order to avoid any unexpected movement of the rotor 2 when the first handling tooling 43 is removed. During this step e), it is possible to use the adjusting means of the first handling tooling 43 in order to longitudinally displace the rotor 2 relative to the stator 3 or vice versa.

As illustrated in FIG. 12, during the step d), the flange 15 of the compressor stator vanes assembly r4 is brought to rest on the bearing surfaces 31 of the supports 30. The recesses 39 allow the passage of the fifth impeller R5. During this step d), the supports 30 can be adjusted relative to the platform 33.

The method comprises, between the steps f) and g), a step f1) of removing the first handling tooling 43 from the module 1.

The fan disc 4 is held during the steps g) to i) via a second handling tooling 51 on which the fan disc 4 is positioned and held, the second handling tooling 51 comprising at least one pair of opposing second trunnions 52, each of the second trunnions 52 being linked to a bracket 46 of a lifting system 47.

According to the embodiment illustrated in the figures and in particular in FIGS. 13 to 18, the second handling tooling 51 comprises a first lifting element 53 and a second lifting element 54 adapted to be secured to the fan disc 4. The first and second lifting elements 53, 54 are arranged symmetrically with respect to the axis X. Each of the lifting elements 53, 54 comprises a trunnion 52, the trunnions 52 being adapted to be attached to a lifting system 47. The lifting system 47 comprises, for example, a lifting device (such as a winch) (not shown), a spreader 50 and two brackets 46.

As illustrated in FIGS. 13 to 17, the fan disc 4 is extracted during the step h) via three extractors 42 distributed in a regular manner around the axis Z. The extraction is controlled by progressively unscrewing three extraction nuts 55 previously screwed onto three screws 8 each located close to one of the three extractors 42, and by progressively inserting wedges 56 around the three screws 8 having the extraction nuts 55 between the fan disc 4 and the drum 5, the extraction nuts 55 and the wedges 56 being made of a non-metallic material.

As illustrated in FIGS. 13 and 14, each extractor 42 comprises a first arm 57 and a second arm 58 hinged to each other, the first arm 57 bearing on the fan disc 4 and the second arm 58 bearing on the annular sealing part 6. Each extractor 42 comprises a hydraulic actuator 59 articulated relative to the first and second arms 57, 58, this hydraulic actuator 59 being configured to move the first and second arms 57, 58 away from each other, thereby vertically extracting the fan disc 4 alone from the sealing part 6 on which it is press-fitted.

The wedges 56 allow to prevent the fan disc 4 from inclining during a drop in hydraulic pressure at the level of the extractors 42.

Advantageously, the extraction nuts 55 and the wedges 56 are made of a non-metallic material, so as not to damage the screws 8. The extraction nuts 55 and the wedges 56 are made of Teflon®, for example.

As illustrated in FIGS. 15-17, the step h) chronologically comprises the sub-steps of:

h1) arranging each extraction nut 55 at a distance D from a upper face 60 of a corresponding lobe 16 of the fan disc 4, the upper face 60 being arranged opposite the extraction nut 55; (FIG. 15)

h2) actuating the three extractors 42 so that each upper face 60 is in contact with the corresponding extraction nut 55; (FIG. 16)

h3) arranging one or more wedges 56 having a total height H around each screw 8 having an extraction nut 55 between the fan disc 4 and the drum 5, the total height H being equal to the distance D. (FIG. 17)

The sub-steps h1) to h3) are repeated so that the fan disc 4 is raised as much as possible above the drum 5. For example, the nut 9 is set at a distance D=6 mm to start the extraction and then the nut 9 is unscrewed by 3 mm at each repetition of the steps h1) to h3) so that the fan disc 4 is 15 mm away from the drum 5 after four cycles.

Such an extraction of the fan disc 4 allows to provide a vertical removal and prevents contact between the screws 8 and the holes embodied in the lobes 16 of the fan disc 4.

As shown in FIGS. 13 to 18, during the steps h) and i), the screws 8 are still in place (except for the two reference screws).

At the end of the steps a) to i), the module 1 is in its third state E3. The re-installation (or the placement) of the repaired fan disc (or of a new fan disc) is performed directly on the module 1 as it was after the above-mentioned method, i.e. in its third state E3 and placed on the tool 22. The same tool 22 allow to be used to remove the fan disc 4 and also to install it again. During the re-installation, care must be taken to correctly orient the repaired fan disc by aligning a mark associated with the repaired fan disc (e.g. a notch) with the marks on the other components of the module 1. When the repaired fan disc is re-installed, the sealing part 6 of the module 1 is heated so as to allow the repaired fan disc can be press-fitted into the sealing part 6 of the module 1.

The invention claimed is:

1. A tool for removing a fan disc alone from a module having a longitudinal axis of a turbomachine comprising a rotor and a stator, the rotor comprising the fan disc, a drum and an annular sealing part centered on the axis and secured to one another via a circular row of bolts each comprising a screw and a nut, each screw passing through a retaining member arranged inside the rotor, each retaining member having at least two opposing lugs arranged around a head of the screw and projecting with respect to the head, the stator being centered on the axis and surrounding the drum, the stator being longitudinally delimited by a compressor stator vanes assembly arranged opposite the fan disc, the compressor stator vanes assembly comprising an outer shell having a flange, the tool having a vertical axis comprising:

a frame comprising ground support means;

an annular plate centered on the axis and secured to the frame, this plate comprising first and second circular rows of pins as well as two holes arranged around the axis at a regular pitch, each of the two holes being arranged between the first and second rows, each of the pins being configured to bear the head of one of the screws so as not to damage the lugs of the retaining members, each of the holes being configured to receive an indexing finger of the module relative to the tool;

at least three supports distributed in a regular manner around the axis (Z) and secured to the frame, each of the supports comprising a bearing surface, the bearing surfaces being coplanar and being configured to support the flange of the compressor stator vanes assembly of the module, the three supports being vertically located below the plate;

a first visual marker arranged on the frame and configured to angularly orient the module relative to the tool.

2. The tool according to claim 1, wherein the tool comprises a second visual marker arranged on the frame and configured to determine a vertical position of the module from which the module is to be indexed relative to the tool.

3. The tool according to claim 1, wherein each of the three supports comprises a recess configured to allow the passage of an annular row of vanes fitted to the drum.

4. A method for removing a fan disc alone from a module having a longitudinal axis of a turbomachine comprising a rotor and a stator, the rotor comprising the fan disc, a drum and an annular sealing part centered on the axis and secured to one another via a circular row of bolts each comprising a screw and a nut, each screw passing through a retaining member arranged inside the rotor, each retaining member having at least two opposing lugs arranged around a head of the screw and projecting with respect to the head, the stator being centered on the axis and surrounding the drum, the stator being longitudinally delimited by a compressor stator vanes assembly arranged opposite the fan disc, the compressor stator vanes assembly comprising an outer shell having a flange, by means of the tool according to claim 1, the method comprising chronologically the steps of:

a) removing two predetermined bolts hereinafter referred to as reference bolts so as to have two free orifices at the level of the rotor, the angular distance between the reference bolts being equal to the angular distance between the two holes of the plate;

b) positioning the module above the tool in a vertical position so that the longitudinal axis of the module is substantially vertical and substantially coaxial with the vertical axis of the tool, the fan disc then being vertically above the drum;

c) aligning one of the free orifices with the first visual marker so as to angularly orient the module with respect to the tool;

d) indexing the module with respect to the tool by introducing two indexing fingers from the outside of the module, each indexing finger passing through a free orifice of the rotor and then through one of the two holes of the plate;

e) abutting the heads of the screws on the pins of the plate, the drum then surrounding the plate;

f) abutting the flange of the compressor stator vanes assembly on the bearing surfaces of the three supports;

g) removing all the nuts from the bolts;

h) extracting in a controlled manner the fan disc alone via at least one extractor;

i) removing the fan disc alone.

5. The method according to claim 4, wherein the fan disc is extracted during the step h) via three extractors distributed in a regular manner around the axis, the extraction being controlled by progressively unscrewing three extraction nuts previously screwed onto three screws each located close to one of the three extractors and by progressively inserting wedges around the three screws having the extraction nuts between the fan disc and the drum, the extraction nuts and the wedges being in a non-metallic material.

6. The method according to claim 5, wherein the step h) comprises the sub-steps of:

h1) arranging each extraction nut at a distance from an upper face of a corresponding lobe of the fan disc, the upper face being arranged opposite the extraction nut;

h2) actuating the three extractors so that each upper face is in contact with the corresponding extraction nut;

h3) arranging one or more wedges having a total height around each screw having an extraction nut between the fan disc and the drum, the total height being equal to the distance.

7. The method according to claim 4, wherein the step d) is carried out when the flange of the compressor stator vanes assembly is located vertically at the level of a second visual marker arranged on the frame of the tool.

8. The method according to claim 4, wherein the module is held during the steps a) to f) via a first handling tooling on which the module is positioned and held, the first handling tooling (43) comprising at least one pair of opposing first trunnions, each of the first trunnions being linked to a bracket of a lifting system.

9. The method according to claim 8, wherein the first handling tooling is configured to allow the positioning of the rotor relative to the stator to be adjusted longitudinally over a predetermined range or vice versa.

10. The method according to claim 4, wherein the fan disc is held during the steps g) to i) via a second handling tooling on which the fan disc is positioned and held, the second handling tooling comprising at least one pair of opposing second trunnions, each of the second trunnions being linked to a bracket of a lifting system.

* * * * *